(12) United States Patent
Thalange et al.

(10) Patent No.: US 11,818,290 B2
(45) Date of Patent: Nov. 14, 2023

(54) SYSTEM AND METHOD FOR AUTOMATIC AGENT ASSISTANCE BASED ON REAL-TIME METRICS

(71) Applicants: Varsha Thalange, Sunnyvale, CA (US); Arvind Gopal, Sunnyvale, CA (US)

(72) Inventors: Varsha Thalange, Sunnyvale, CA (US); Arvind Gopal, Sunnyvale, CA (US)

(73) Assignee: eGain Communications Corporation, Sunnyvale, CA (US)

( * ) Notice: Subject to any disclaimer, the term of this patent is extended or adjusted under 35 U.S.C. 154(b) by 260 days.

(21) Appl. No.: 16/537,338

(22) Filed: Aug. 9, 2019

(65) Prior Publication Data

US 2021/0044698 A1 Feb. 11, 2021

(51) Int. Cl.
*H04M 3/00* (2006.01)
*H04M 3/51* (2006.01)
*G06Q 10/0631* (2023.01)
*G06Q 30/016* (2023.01)
*G06Q 10/0639* (2023.01)
*H04M 3/523* (2006.01)

(52) U.S. Cl.
CPC .... *H04M 3/5175* (2013.01); *G06Q 10/06398* (2013.01); *G06Q 10/063112* (2013.01); *G06Q 30/016* (2013.01); *H04M 3/5233* (2013.01); *H04M 2203/401* (2013.01); *H04M 2203/402* (2013.01)

(58) Field of Classification Search
CPC ..... G06Q 10/063112; G06Q 10/06398; G06Q 30/016; G06Q 30/04; H04M 3/5175; H04M 3/5191; H04M 3/5233
See application file for complete search history.

(56) References Cited

U.S. PATENT DOCUMENTS

| 7,110,525 | B1* | 9/2006 | Heller | H04M 3/523 |
| | | | | 379/265.11 |
| 9,392,114 | B1* | 7/2016 | Bobowski | H04M 3/5175 |
| 2015/0100528 | A1* | 4/2015 | Danson | G06N 5/04 |
| | | | | 706/21 |
| 2015/0334233 | A1* | 11/2015 | O'Connor | G06F 16/24578 |
| | | | | 379/265.03 |
| 2016/0125484 | A1* | 5/2016 | Hanson | H04L 65/403 |
| | | | | 705/347 |

\* cited by examiner

*Primary Examiner* — Rasha S Al Aubaidi

(57) ABSTRACT

Embodiments of the present invention provide systems and methods for determining an engagement level for a customer-agent interaction (e.g., a phone call, text chat, etc.), and the engagement level can be used to evaluate the performance of the agent. For example, the engagement level can be used to determine or adjust a skill level of the agent, a performance of the communication channel that facilitates the interaction, and/or an optimal workload of the agent. According to some embodiments, the engagement level is used to determine that the agent may be experiencing difficulty satisfying a customer inquiry such that the agent should be assigned resources or assistance.

20 Claims, 8 Drawing Sheets

SYSTEM AND METHOD FOR AUTOMATIC AGENT ASSISTANCE BASED ON REAL-TIME METRICS

CROSS-REFERENCE TO RELATED APPLICATIONS

This application is related to and fully incorporates by references co-pending patent application Ser. No. 16/537,354, entitled "SYSTEM AND METHOD FOR AUTOMATIC MEASUREMENT OF INTERACTIVITY SCORE FOR CUSTOMER-AGENT INTERACTION," with filing date Aug. 9, 2019, and hereby incorporated by reference in its entirety.

FIELD

Embodiments of the present invention generally relate to the field of systems and methods related to providing customer service. More specifically, embodiments of the present invention relate to systems and methods for automatically evaluating the performance of an agent during a customer service session.

BACKGROUND

Traditionally, agents (e.g., customer service agents) receive tasks at a customer service center in a first-come-first-serve basis. However, this approach fails to consider the current level of engagement of an agent with a customer or a group of customers and is unable to determine when the agent should be assigned additional tasks or to assess the performance of an agent over time. Traditional approaches that do not take into consideration the type of agent-customer engagement also fail to properly assess the true workload being performed by an agent. In other words, the traditional approaches often fail to appreciate how hard an agent is actually working. These failures may result in some agents appearing busy, but not working to their potential, or other agents being actually quite busy but still being assigned new work. The workloads of the agents may not be well-balanced. Moreover, traditional approaches to managing customer service agents are unable to automatically determine if an agent requires assistance on a difficult task, for example. What is needed is a method and system for providing service to customers that consider real-time metrics when managing agent workloads, assigning tasks to agents, determining an agent's performance, and determining when an agent may require assistance in helping a customer.

SUMMARY OF THE INVENTION

Embodiments of the present invention provide systems and methods for determining an engagement level for a customer-agent interaction (e.g., a phone call, text chat, etc.) during a customer service session, and the engagement level can be used to generate an engagement level value of the agent which can be used to evaluate the performance and workload of the agent. For example, the engagement level can be used to determine or adjust a skill level of the agent, a performance of the communication channel that facilitates the interaction, and an optimal workload for the agent. According to some embodiments, an engagement level of the session between the agent and the customer is used to determine that the agent may be experiencing difficulty satisfying a customer inquiry so that the agent can be assigned additional resources or assistance. The engagement level of the agent can also be useful in evaluating the actual workload performed by an agent.

According to one embodiment, a method for managing a workload of a call center is disclosed. The method includes receiving a plurality of customer inquiries from customers over communication channels of the call center, assigning an initial interactivity score to a respective inquiry based on a type communication channel over which the respective inquiry is received, assigning skill levels to a plurality of agents, determining agent interactivity scores of the plurality of agents, assigning customer inquiries to the agents based on initial interactivity scores of the inquiries, the agent interactivity scores, and the skill levels, measuring engagement levels between the plurality of agents and the customers, and determining that a productivity level of a first agent of the plurality of agents is below a productivity threshold based an engagement level of an inquiry associated with the first agent.

According to some embodiments, the method includes reassigning a customer inquiry assigned to the first agent responsive to the determining that the productivity level of the first agent is below the productivity threshold.

According to some embodiments, the determining that a productivity level of a first agent is below a productivity threshold includes comparing the first engagement level to a second engagement level, and further including assigning resources to the first agent when the second engagement level is significantly lower than the first engagement level.

According to some embodiments, the method includes adjusting a skill level of the first agent responsive to the determining that the productivity level of the first agent is below the productivity threshold.

According to some embodiments, the method includes providing a visual notification indicating a potential problem with a first customer inquiry assigned to the first agent responsive to the determining that the productivity level of the first agent is below the productivity threshold.

According to some embodiments, the determining that the productivity level of the first agent is below the productivity threshold includes measuring a rate of communication of a customer inquiry involving the first agent and a first customer.

According to some embodiments, the determining that a productivity level of a first agent is below the productivity threshold includes measuring an idle time of a customer inquiry assigned to the first agent.

According to some embodiments, the determining that a productivity level of a first agent is below the productivity threshold includes measuring a duration of a first customer inquiry assigned to the first agent and comparing the duration to an expected duration associated with the first customer inquiry.

According to some embodiments, the determining that a productivity level of a first agent is below a productivity threshold includes determining that a communication session associated with a first customer inquiry assigned to the first agent has ended.

According to some embodiments, the determining that a productivity level of a first agent is below a productivity threshold includes determining that a customer associated with a first customer inquiry has sent inquiries over multiple communication channels.

According to some embodiments, the determining that a productivity level of a first agent is below a threshold includes determining that a customer associated with a customer inquiry assigned to the first agent has sent a different inquiry approximately within a predetermined time period, and the method further includes assigning resources to the first agent responsive to determining that the customer associated with the first customer inquiry assigned to the first agent has sent the different inquiry within the predetermined time period.

According to another embodiment, a system for managing a workload of a call center is disclosed. The system includes a memory, and a processor in communication with the memory and executing an application to perform a method for assigning tasks to agents. The method includes receiving a plurality of customer inquiries from customers over communication channels of the call center, assigning an initial interactivity score to a respective inquiry based on a type communication channel over which the respective inquiry is received, assigning skill levels to a plurality of agents, determining agent interactivity scores of the plurality of agents, assigning customer inquiries to the agents based on initial interactivity scores of the inquiries, the agent interactivity scores, and the skill levels, measuring engagement levels between the plurality of agents and the customers, and determining that a productivity level of a first agent of the plurality of agents is below a productivity threshold based an engagement level of an inquiry associated with the first agent.

According to some embodiments, the method further including receiving customer satisfaction ratings and adjusting the skill levels based on the customer satisfaction ratings.

According to another embodiment, a non-transitory computer-readable storage medium embodying instructions that, when executed by a processor, cause the processor to perform a method of managing a workload of a call center is disclosed. The method includes receiving a plurality of customer inquiries from customers over communication channels of the call center, assigning an initial interactivity score to a respective inquiry based on a type communication channel over which the respective inquiry is received, assigning skill levels to a plurality of agents, determining agent interactivity scores of the plurality of agents, assigning customer inquiries to the agents based on initial interactivity scores of the inquiries, the agent interactivity scores, and the skill levels, measuring engagement levels between the plurality of agents and the customers, and determining that a productivity level of a first agent of the plurality of agents is below a productivity threshold based an engagement level of an inquiry associated with the first agent.

According to a different embodiment, a method of managing workloads in a call center is disclosed including receiving customer inquiries over a plurality of different types of communication channels, assigning customer inquiries to agents of the call center wherein a first customer inquiry of said customer inquiries is assigned to a first agent and wherein said first customer inquiry involves a first customer, measuring a performance of said first agent by real-time automatic measuring of an engagement level of the first customer inquiry during a communication involving the first agent and the first customer, determining if the engagement level falls below a threshold engagement value, and automatically performing an assistance function for the first agent responsive to a determination that the engagement level fell below said threshold engagement value.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1A:
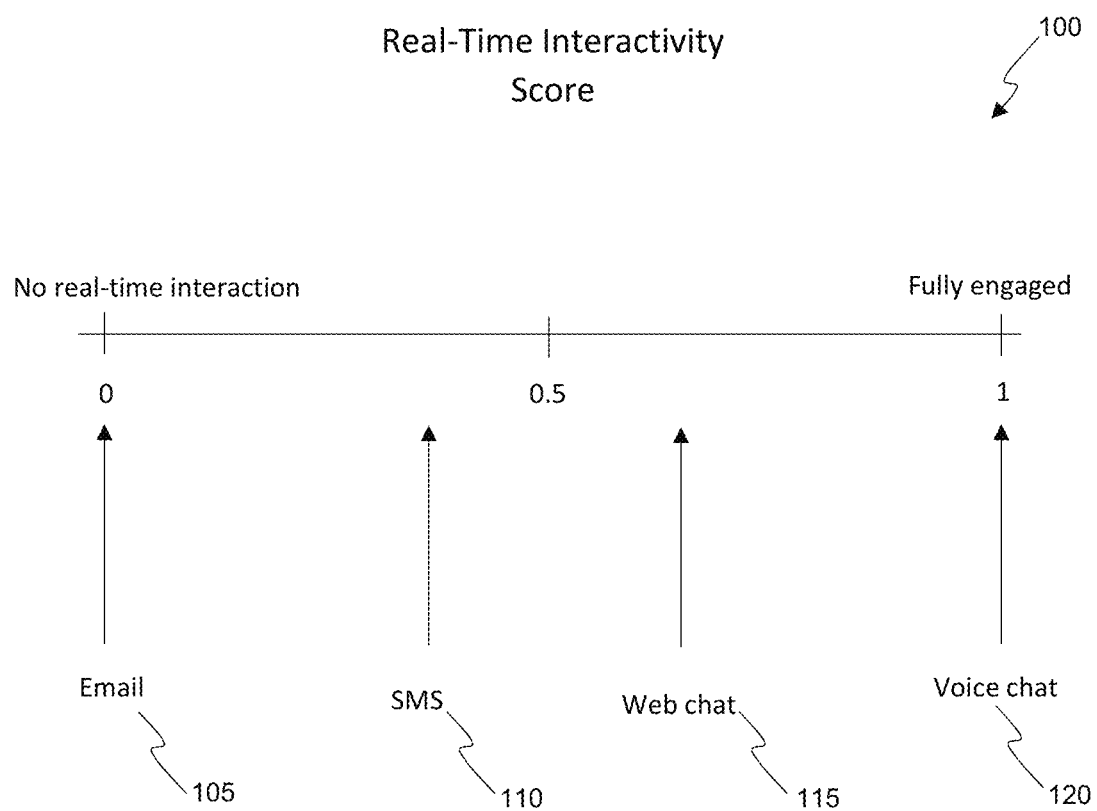
FIG. 1A is a chart of exemplary interactivity scores ranging from 0 to 1 for different communication channels depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Portions of the detailed description that follows are presented and discussed in terms of a method. Although steps and sequencing thereof are disclosed in a figure herein (e.g., FIGS. 3 and 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "displaying," "writing," "including," "storing," "rating," "transmitting," "traversing," "determining," "identifying," "observing," "adjusting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Automatic Measurement of Interactivity and Engagement Level

Embodiments of the present invention provide systems and methods for automatically determining an engagement level related to a customer service session for a customer-agent interaction (e.g., a phone call, text chat, etc.), and the engagement level can be used to generate an engagement level of the agent which can be used to evaluate the performance and/or workload of the agent. For example, the engagement level can be used to determine or adjust a skill level of the agent, a performance of the communication channel that facilitates the interaction, and/or an optimal workload for the agent. According to some embodiments, the engagement level of the session is used to determine that the agent may be experiencing difficulty satisfying a customer inquiry such that the agent should be assigned additional resources or assistance. The engagement level of the agent can also be used to assess the performance of an agent.

With regard to FIG. 1A, a chart 100 of exemplary interactivity scores ranging from 0 to 1 for different communication channels is depicted according to embodiments of the present invention. Means of communication are rated along a scale of between 0 and 1 based on the expected rate or level of interaction that can be expected between parties based on the type of communication channel used. As depicted in FIG. 1A, forms of or types of communication that are not performed in real-time, such as emails, have a low interactivity score, such as 0 or 0.1. On the other end of the scale, real-time type voice communications such as voice chat or phone calls between the customer and the agent typically have an interactivity score of 1, or a score that indicates that a typical agent will likely be fully engaged in the customer service session very likely to be and unable to accept additional tasks until the voice communication is complete. Other forms of or types of communication typically fall between 0 and 1 on the interactivity scale, such as SMS messages and web chat, and an agent can handle multiple communication sessions at once as long as the agent's total interactions remain below a predetermined threshold (e.g., 1). According to some embodiments, voice chats and phone calls are considered the highest priority type communications channel and are assigned before inquires received over other communication channels when possible. If an agent is simultaneously handling multiple customer service sessions via one or more different communication channel types, the interactivity scores for each are summed to yield a real-time interactivity score for the agent.

Initial interactivity scores may be used for assigning tasks (e.g., customer inquiries) to agents (e.g., customer service agents) and managing workloads and performances of agents. Embodiments of the present invention can assign an initial interactivity score to a communication or inquiry based on the communication type, and the initial interactivity score may be adjusted based on an analysis of the communication session in real-time. For example, an SMS or direct message may initially be assigned an interactivity score of 0.4, and when several messages are received from the customer in a short period of time, the interactivity score for the session may be raised to 0.5 or 0.6, for example. Similarly, a web-chat may be initially assigned an interactivity score of 0.6 based on the communication type and lowered to 0.4 when the rate of the web-chat is determined to be lower than expected. The initial interactivity scores may be based on the communication channel types, a history of prior communications that involve similar subject matter, a history of prior communications with a similar type of user or product, or a history of prior conversations with the same customer or a combination of these. The initial interactivity scores assigned to various communication channels types can be adjusted thereafter based on interactions over the communication channels observed in real-time.

Based on initial interactivity scores, inquiries can be assigned to agents according to the current interactivity score of the agent and/or based on the skill level of the agent and/or the difficulty of the inquiry in order to optimize the agent's workload. For example, using the interactivity scale depicted in FIG. 1A, an agent will typically only be assigned one voice chat or phone call at a time. An agent of common skill level can typically accept multiple web chats or SMS inquiries at a time. In general, an agent is expected to communicate with a customer at roughly the same rate that the customer is communicating with the agent in order to achieve a satisfactory customer service experience.

According to some embodiments, an agent's ability to interact effectively over specific communication channels is evaluated over time, and their skill level is adjusted accordingly. For example, according to some embodiments, a customer satisfaction rating is provided by customers during or after a communication session, and the agent's skill level is adjusted based on the customer satisfaction rating. Moreover, some embodiments of the present invention measure a number of inquiries satisfied by an agent during a time period and determine the effectiveness (e.g., skill level) of the agent based on the number of inquiries. For example, according to some embodiments, an agent's performance may be considered 'good', 'overloaded', 'underperforming', etc., based on the number of inquiries satisfied during the time period. Communication channel types can also be evaluated based on the number of inquiries satisfied over a time period, and the initial interactivity score of the communication channel type can be adjusted accordingly.

To determine the real-time interactivity score applied to an agent, the system sums together all of the interactivity scores of each customer service session in which the agent is simultaneously engaged to determine a current agent interactivity score. Therefore, the agent could be processing two customer service sessions by SMS, one by web chat, and one by phone. The scores of each of these inquiries are summed together to determine the real-time interactivity score of the agent.

Figure 1B:
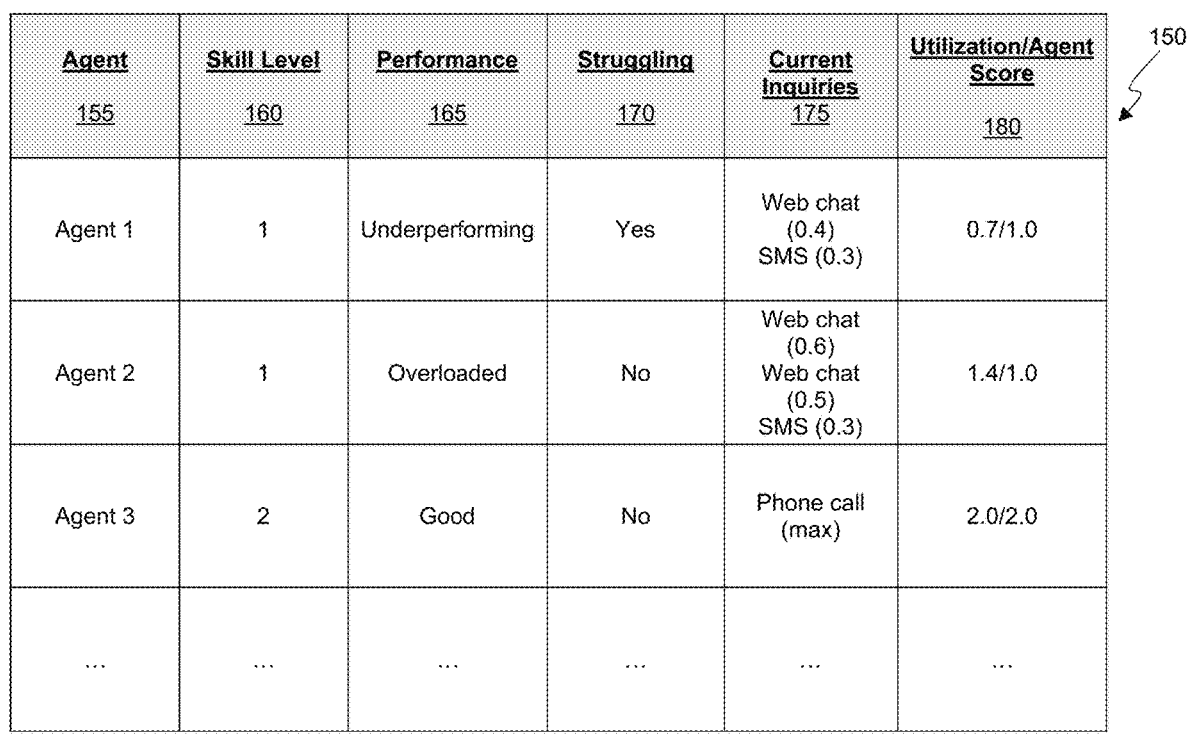
FIG. 1B is an exemplary table for storing agent information depicted according to embodiments of the present invention.

With regard to FIG. 1B, an exemplary table 150 for storing agent information is depicted according to embodiments of the present invention. The table 150 may be stored in an agent database or workload management system of a call center, for example. Agent column 155 stores names or ID numbers of agents working at a call center. The agents are associated with a skill level 160, a performance level 165, a struggling indicator 170, a list of current inquiries 175, and a utilization level 180 also called an agent interactivity score. Other information associated with agents of the call center, such as an inquiry history, may also be stored in table 150 according to embodiments of the present invention. Agent skill level 160 may be adjusted over time according to the agent's performance level. For example, an agent with a skill level of 1 that is consistently performing well may be assigned a skill level of 2 indicating that the agent is not fully utilized until their total interaction level reaches a score of 2.0. The performance level 165 can be based on the number of inquiries an agent satisfies within a given time period. According to some embodiments, an agent that fails to reach a performance level threshold (e.g., 3 inquiries per hour) is considered to be underperforming. Moreover, an agent that is assigned too many inquiries such that their utilization level is above their maximum utilization may be considered overloaded.

Table 150 can automatically flag agents that are having difficulty with an inquiry using struggling indicator 170. As described herein with regard to FIG. 4, an agent maybe considered to be struggling when an engagement level of an inquiry drops substantially over time, or when a customer remains idle for an extended period of time, for example. The struggling indicator 170 indicates than an agent should be assigned additional resources or assistance to help satisfy the inquiry.

Current inquiries 175 stores a list of active inquiries that are currently assigned to an agent and the current interactivity score of the inquiry. For example, in table 150 Agent 1 is depicted as being assigned to a web chat having an interactivity score of 0.4 and an SMS inquiry having an interactivity of 0.3. It is to be appreciated that the interactivity scores of each customer service session can change over-time based on real-time metrics, such as the rate of communications received from the customer. The sum of the interactivity scores is 0.7 which is the interactivity score of the agent, which is less than the maximum interactivity score assigned to the agent (1.0). Therefore, the agent is not fully utilized and can accept additional inquiries, and utilization level 180 shows that the agent is currently 70% utilized. Similarly, Agent 2 is depicted as being assigned to web chats having interactivity scores of 0.6 and 0.5, and an SMS inquiry having an interactivity score of 0.3. Therefore, the total interactivity score of the agent is 1.4, which is above the maximum utilization score assigned to the agent (1.0). Therefore, utilization level 180 shows that the agent is 140% utilized, indicating that Agent 2 may be overloaded. Agent 3 is currently assigned to a phone call requiring the full utilization of the agent (2.0).

Figure 1C:
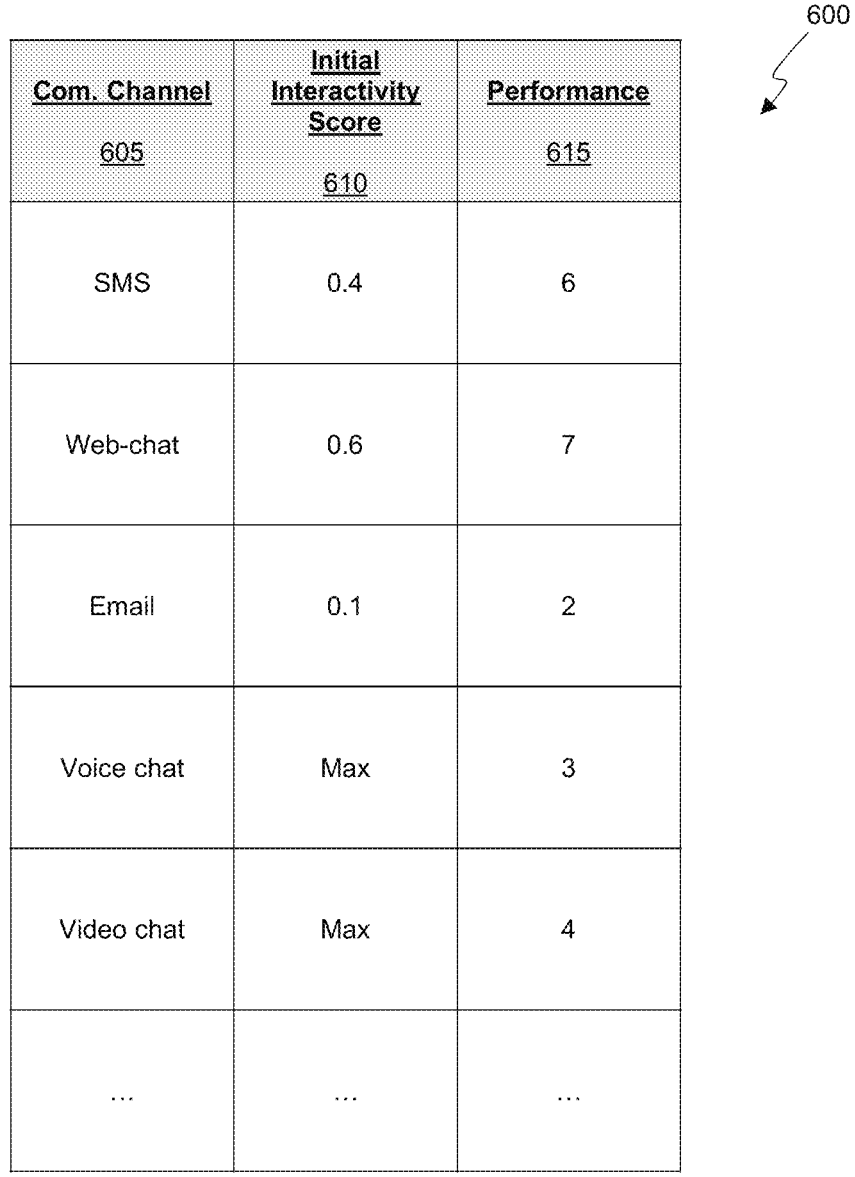
FIG. 1C is an exemplary table for storing a list of communication channels and associated initial interactivity scores and performance levels depicted according to embodiments of the present invention.

With regard to FIG. 1C, an exemplary table 600 for storing a list of communication channels and associated initial interactivity scores and performance levels is depicted according to embodiments of the present invention. The table 600 may be stored in a database or workload management system of a call center, for example. The communication channel types 605 are associated with initial interactivity scores 610 based on the type of communication channel (for instance) or the expected level of engagement between the agent and the customer indicating the expected level of interaction between a customer and an agent for discussing an inquiry over the communication channel. The performance level 615 of a communication channel can indicate the rate at which inquiries are satisfied over the communication channel (e.g., 6 inquires per hour). The performance level 615 is modified based on real-time metrics observed during the communication sessions, and the initial interactivity score 610 can be adjusted advantageously based on the observed rate of interaction between the customer and the agent. In this way, inquiries can be assigned to agents based on the initial interactivity score of the communication channel and the current interactivity score of the agent to optimize the workload of the agent and improve efficiency of the call center.

Figure 1D:
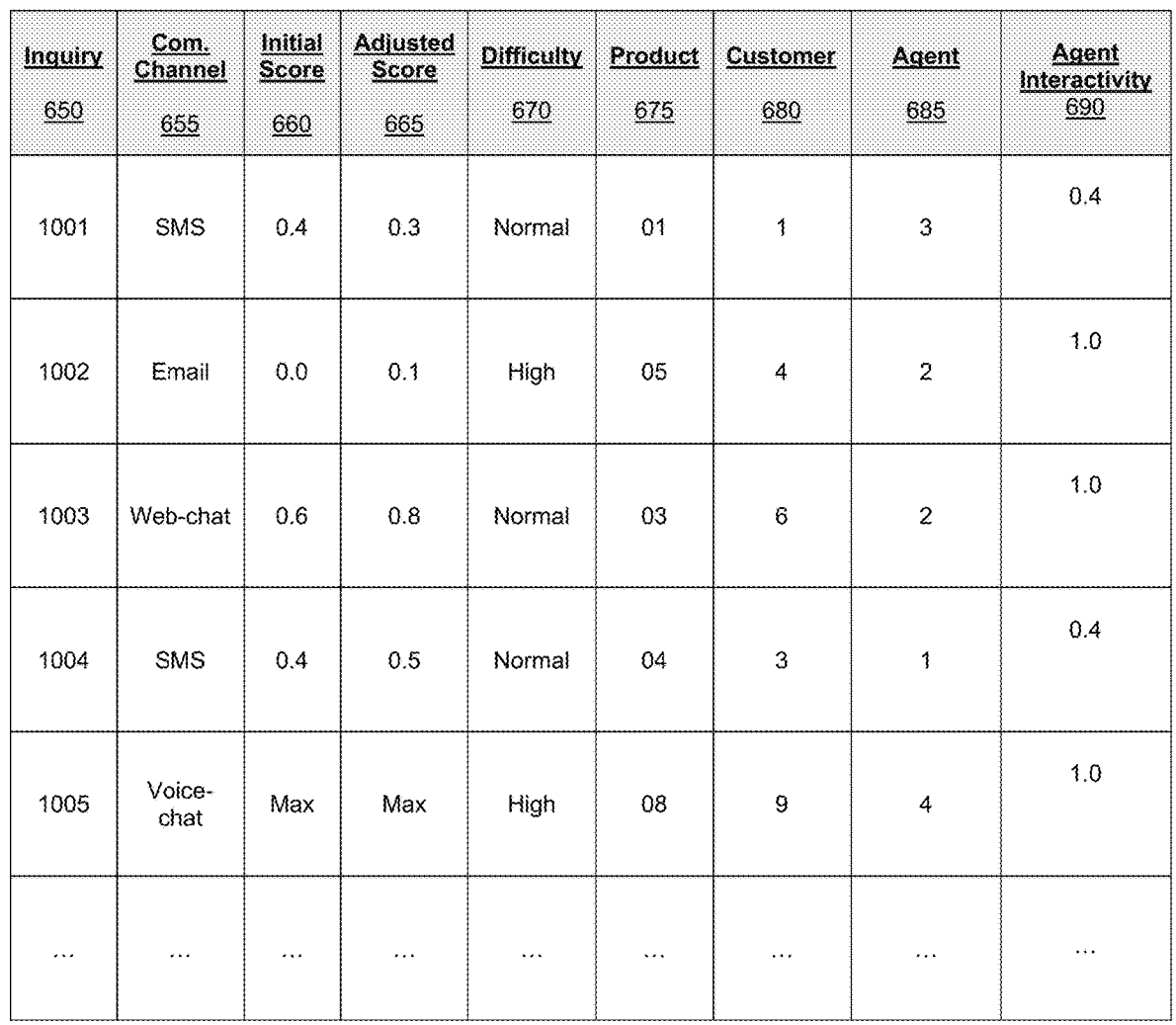
FIG. 1D is an exemplary table for storing a list of inquiries and associated information depicted according to embodiments of the present invention.

With regard to FIG. 1D, an exemplary table 650 for storing a list of inquiries and associated information is depicted according to embodiments of the present invention. The table 650 may be stored in a memory resident computer database or computerized workload management system of a call center, for example. The inquiries 650 can be listed by inquiry number and are received from customers 680 over one or more communication channel types 655. The inquiries 650 are assigned to sessions and an initial interactivity score 660 based on the communication channel type 655. Based on real-time metrics observed during a customer-agent interaction associated with an inquiry, the initial interactivity score of the customer session is adjusted to generate an adjusted interactivity score 665 of the session. The inquiries 650 are also associated with a difficulty level 670 indicating how challenging the inquiry is expected to be in order to solve. Moreover, the inquiries 650 may be associated with a specific product 675 listed by name or product ID, for example. The table 650 also includes names and/or identification numbers of the agent or agents 685 assigned to the inquiries 650, and the table 650 is continuously updated in real-time based to reflect new inquiries and real-time metrics observed during the course of communication between agents and customers. The agent interactivity score 650 indicates the sum of the real-time interactivity levels of all inquiries ("customer service sessions") assigned to the agent associated with an inquiry.

Figure 2:
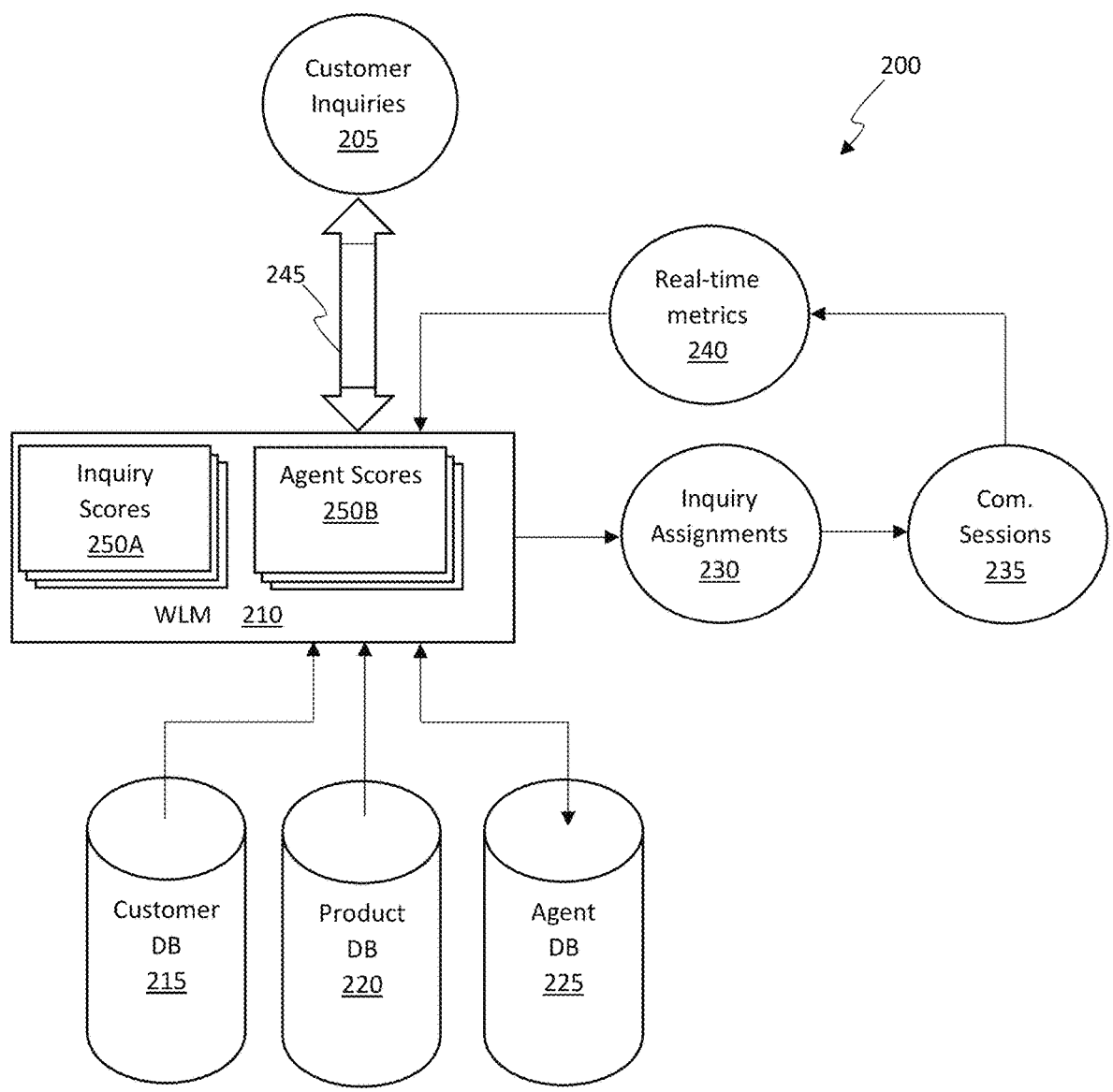
FIG. 2 is a block diagram and data flow diagram of an exemplary computer system for managing a workload of a call center and assigning inquiries to agents based on real-time interactivity scores depicted according to embodiments of the present invention.

With regard to FIG. 2, a block diagram and data flow diagram of an exemplary computer system 200 for managing a workload of a call center and assigning inquiries to agents based on real-time interactivity scores is depicted according to embodiments of the present invention. Customer inquiries 205 are received by a workload management (WLM) system 210 over one or more communication channels 245. According to some embodiments, the customer inquiries 205 are associated with a product, a difficulty level, and a communication channel type over which the inquiry is received and/or responded to.

The WLM system 210 can automatically determine which inquiries should be assigned to which agents to maximize the abilities of the agent and prevent an agent from being overloaded or underutilized. Inquiry interactivity scores 250A and agent interactivity scores 250B are stored and continuously updated by the WLM system according to real-time metrics 240 of observed communication sessions. The inquiry interactivity scores 250A and agent interactivity scores 250B are used to assign inquiries 205 to specific agents, and may be based on the agent's skill level and/or the difficulty of the inquiry. In this way, the WLM system 250 generates inquiry assignments 230 for the inquiries, and communication sessions 235 between agents and customers are monitored to generate real-time metrics 240. The communication sessions may be performed using a messaging app (e.g., SMS, Facebook messenger, Whatsapp, Twitter direct messaging, browser-based chat, etc.), a voice or video communication service (e.g., Facetime, Skype, voice call, etc.), other forms of real-time communication, or communications that do not occur in real-time, such as an email message, a message board or forum post, etc. The real-time metrics 240 may include metrics for determining an engagement level for a specific communication session between a customer and an agent, and inquiry interactivity scores 250A and agent interactivity scores 250B stored by the WLM system 210 can be updated according to the engagement level. For example, an interactivity score 250 may be associated with a specific communication channel types or agents, and the scores are continuously updated based on the real-time metrics 240.

Based on the inquiry interactivity scores 250A and the agent interactivity scores 250B, the WLM 210 assigns incoming customer inquiries 205 to agents to generate inquiry assignments 230. For example, an inquiry may be assigned to a specific agent when the agent's current score is low enough to accept the interactivity score associated with the communication type. In one example, an agent with a current agent interactivity score of 0.5 can accept a new inquiry having an interactivity score of 0.4 without becoming overburdened, as the agents total score will remain under a predetermined threshold (e.g., 1.0). The inquiry assignments 230 can be in the form of a table such as table 650 depicted in FIG. 1D. The inquiry assignments 230 assigned to agents result in communication sessions 235 between agents and customers for attempting to solve customer inquiries 205. During the communication session 235, real-time metrics are measured and the inquiry interactivity scores 250A and the agent interactivity scores 250B are adjusted and updated based on the real-time metrics. According to some embodiments, the interactivity scores are associated with specific communication channel types or agents. According to some embodiments, the inquiry assignments 230 are generated based on skill levels of the agents and/or difficulty levels associated with specific inquiries, in addition to the inquiry interactivity scores 250A and the agent interactivity scores 250B. The inquiry assignments 230 may be stored in the WLM 210 or agent database 225, for example.

The real-time metrics 240 measured by the computer system 200 can include an engagement level between the agent and a customer (e.g., the rate or cadence of communication during a communication session), a quality or tone of response of the customer, an idle time period during a communication session, and/or the total duration of the communication session, for example. Moreover, according to some embodiments, the metrics 240 can also include events such as a customer prematurely ending a communication session (e.g., before the inquiry is resolved), determining that a customer has sent another inquiry over a different communication channel, and determining that a customer has sent multiple inquiries within a predetermined time period (e.g., 24 hours).

According to some embodiments, the WLM system 210 is in communication with one or more databases, such as a customer database 215, a product database 220, and an agent database 225. The customer database 215 can store a database of customer names or accounts and associated information, such as contact information, addresses, companies, and products registered to the customer, for example. The product database 220 can store a database of products supported by a call center for example, and may include resources for agents to use in providing customer support for the products, such as product manuals, technical guides, etc. The agent database 225 can store a database of agents employed at a call center, for example, and can include agent skill levels, observed performance levels of the agent, and inquiry assignments 230, according to some embodiments.

Figure 3:
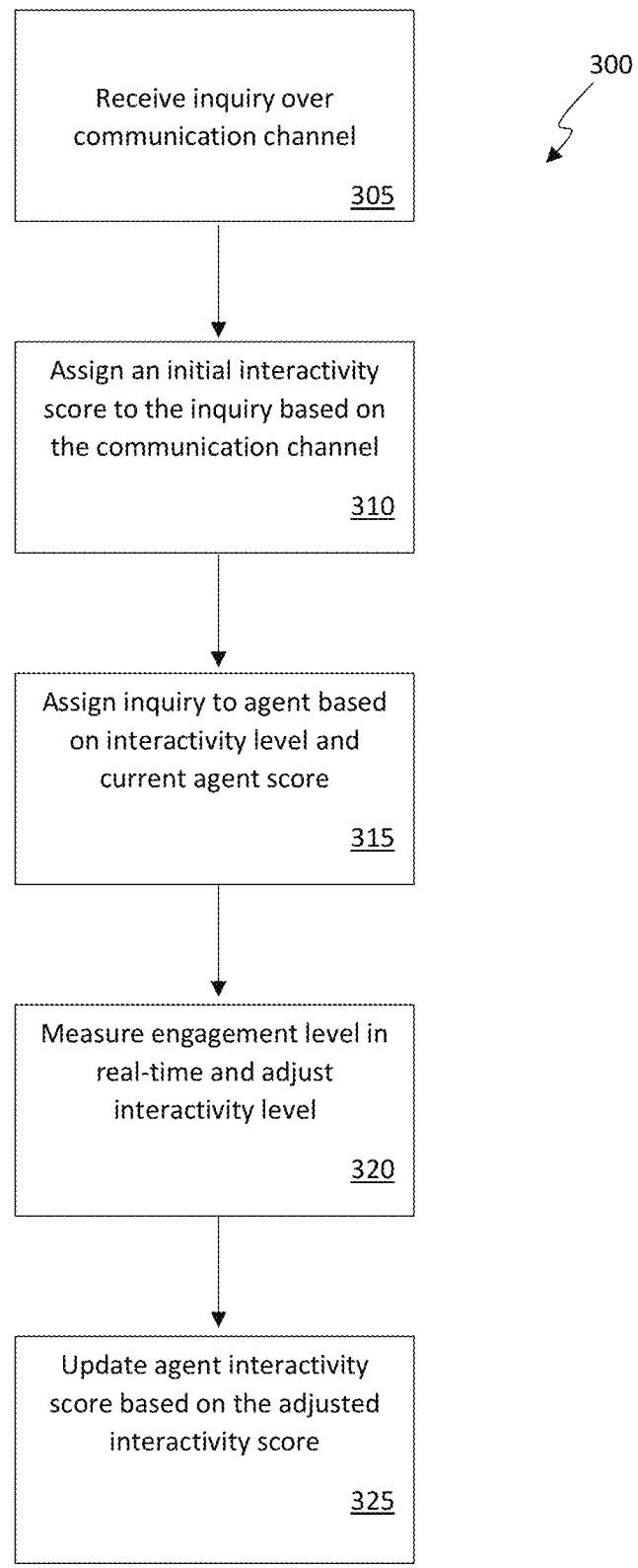
FIG. 3 is a flow chart of an exemplary sequence of computer-implemented steps for automatically assigning inquiries to an agent based on real-time interactivity scores depicted according to embodiments of the present invention.

With regard to FIG. 3, an exemplary sequence of computer-implemented steps 300 for performing a method for automatically assigning an inquiry to an agent based on real-time interactivity scores is depicted according to embodiments of the present invention. At step 305, a customer inquiry is received over a communication channel, such as an email, SMS message, web-chat, or phone call. At step 310, the communication channel type over which the inquiry is received is associated with an initial interactivity score, and the initial interactivity score of the communication channel type is assigned to the inquiry. At step 315, the inquiry is assigned to a specific agent that can accept the inquiry without becoming overburdened. For example, step 315 can include determining if the sum of the interactivity score associated with the inquiry or communication type and a current interactivity score of the agent is less than a predetermined threshold (e.g., 1). The assignment to the specific agent may be further based on a skill level of the agent and/or a difficulty level associated with the inquiry.

At step 320, the real-time engagement level of the communication between the agent and the customer is measured to adjust the initial interactivity level assigned to the communication session. The real-time engagement level can be determined based on the rate or cadence of communication during a communication session, an idle time period during a communication session, and/or the total duration of the communication session, etc. For example, a customer inquiry sent in an SMS message may initially be assigned an interactivity score of 0.4 and is adjusted to 0.6 when several SMS messages corresponding to the inquiry are received in a short time span (e.g., one minute). At step 325, the agent interactivity score is updated based on the adjusted interactivity score to generate an updated agent interactivity score.

According to some embodiments, when a second customer inquiry is received from a customer over a communication channel, the second customer inquiry is assigned to an agent based on the current interactivity score of the agent (including the adjusted interactivity level of the previous inquiry) and an initial interactivity level of the new inquiry. For example, if the adjusted interactivity level of the previous inquiry is 0.3, the agent's total interactivity score is 0.6, and the initial interactivity level of the new inquiry is 0.3, the agent that was assigned the previous inquiry can automatically be assigned the new inquiry when the sum of the interactivity levels is below a predetermined threshold (e.g., 1). If the sum of the interactivity levels is beyond the threshold, the new inquiry is automatically assigned to a different agent that meets the criteria for accepting the inquiry based on the agent's interactivity score and the initial interactivity score associated with the inquiry.

Figure 4:
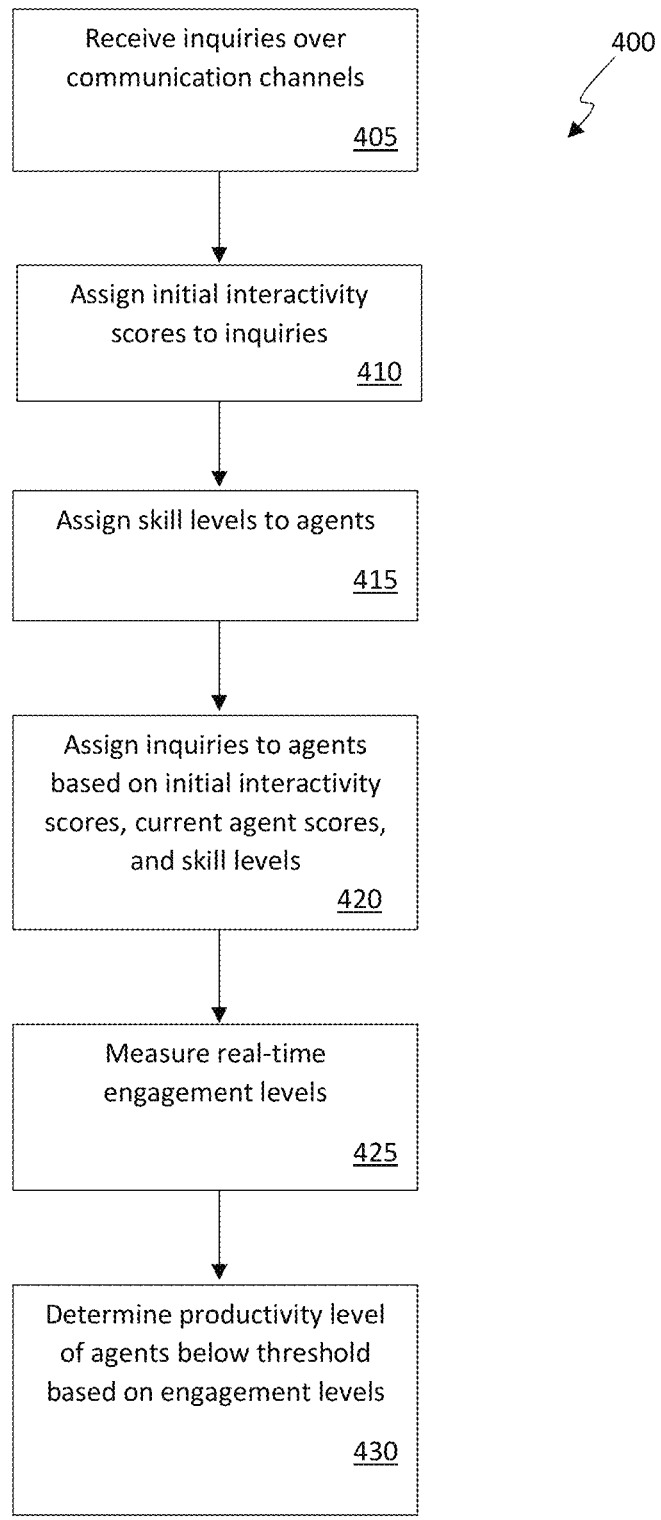
FIG. 4 is a flow chart of an exemplary sequence of computer-implemented steps for automatically managing a workload of a call center depicted according to embodiments of the present invention.

With regard to FIG. 4, an exemplary sequence of computer-implemented steps 400 for automatically managing a workload of a call center is depicted according to embodiments of the present invention. According to some embodiments, the steps 400 include determining that an agent should receive additional resources or assistance for solving a customer inquiry that the agent may be having difficulty with. At step 405, customer inquiries are received over a plurality of communication channels, such as emails, SMS messages, web-chats, or voice calls. At step 410, the communication channel types are associated with initial interactivity scores, and the initial interactivity scores are assigned to inquiries based on the communication channel type over which the inquiries are received. At step 415, agents are assigned skill levels indicating the amount of real-time interaction the agent is capable of performing. At step 420, the customer inquiries are assigned to the agents based on the initial interactivity scores of the inquiries, the current agent interactivity scores, and the agent skill levels at step 420. The current agent interactivity scores generally represent a sum of the interactivity scores of inquiries already assigned to an agent.

At step 425, engagement levels of the communication sessions between customers and agents are measured in real-time. The real-time engagement levels can be determined based on the rate or cadence of communication during a communication session, an idle time period during a communication session, and/or the total duration of the communication session, for example. At step 430, agents having a productivity level below a threshold are identified based on the engagement levels. For example, according to some embodiments, step 430 can include observing the communication session to detect events such as a customer prematurely ending a communication session (e.g., ending a session before the inquiry is resolved), determining that a customer has sent another inquiry over a different communication channel, and determining that a customer has sent multiple inquiries within a predetermined time period (e.g., 24 hours), and the associated engagement level is adjusted accordingly. The detected events can be used at step 430 to determine that the agent is performing below a performance threshold and that the agent may require additional information or assistance. Moreover, some embodiments of the present invention compare a measured duration of the communication session to an expected duration of the communication session, and determine that the agents requires assistance when the measured duration is significantly longer than the expected duration.

According to some embodiments, step 430 includes assigning information or assistance to help the agent satisfy the customer inquiry, or generating a visual notification that indicates that the agent requires assistance. Conversely, if the agent's performance remains above the performance threshold, the agent may be assigned additional inquiries until the agent is fully utilized (see FIG. 3).

According to some embodiments, a second engagement level for the communication session is calculated and compared to the first engagement level measured in step 425. If the second engagement level is significantly lower than the first engagement level, the agent's performance may be determined to be below a threshold, and additional resources may be assigned to the agent. Moreover, the agent's skill level can be adjusted responsive to determining that the agent's performance is below the predetermined performance threshold.

Exemplary Computer System

Embodiments of the present invention are drawn to computer systems determining customer-agent engagement levels in real-time to manage a workload of a call center. The following discussion describes such exemplary computer systems.

Figure 5:
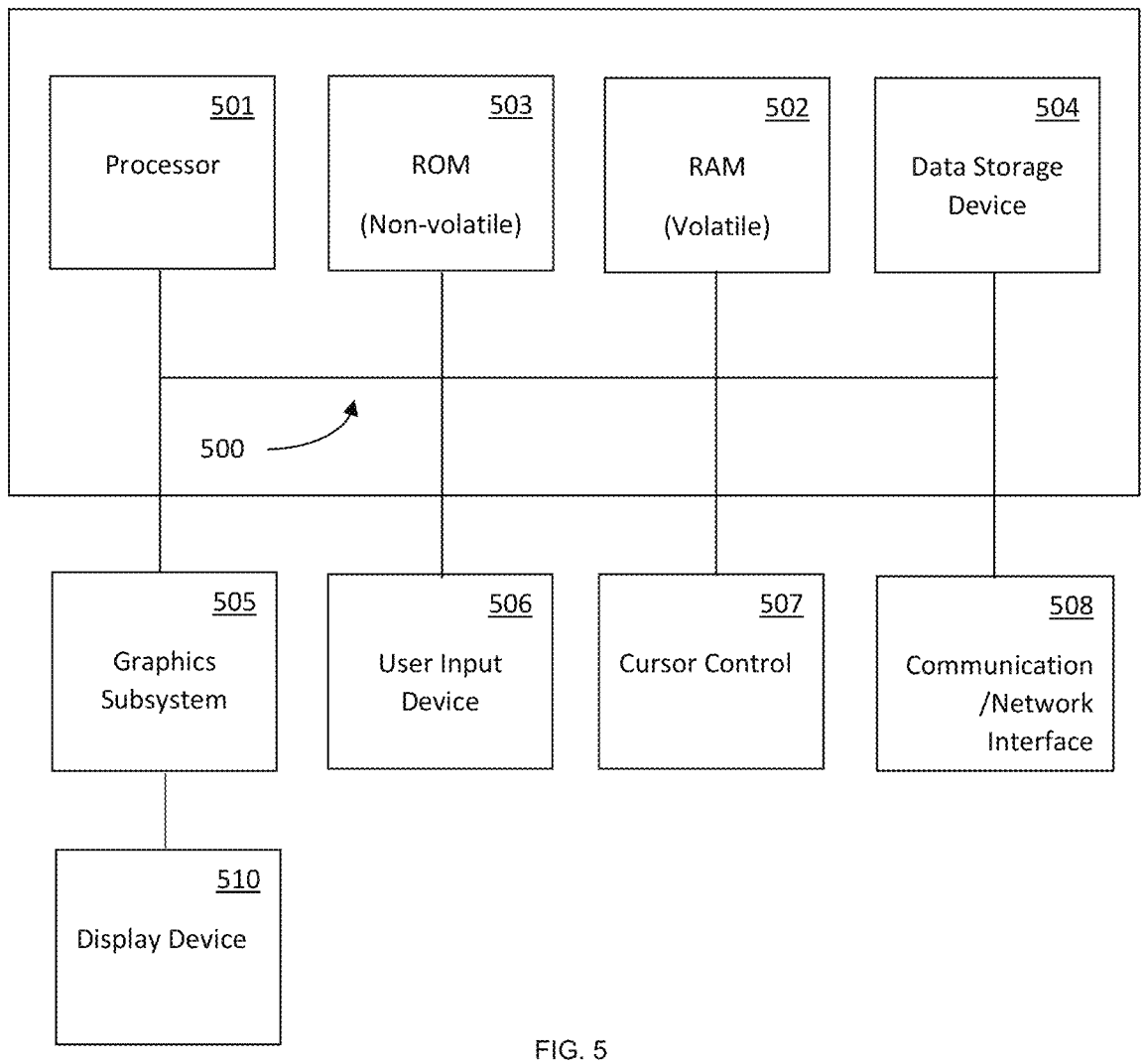
FIG. 5 is a block diagram of an exemplary computer system upon which embodiments of the present invention may be implemented.

In the example of FIG. 5, the exemplary computer system 512 includes a central processing unit (CPU) 501 for running software applications (e.g., a workload management application) and optionally an operating system. Random access memory 502 and read-only memory 503 store applications and data for use by the CPU 501. Data storage device 504 provides non-volatile storage for applications and data and may include fixed disk drives, removable disk drives, flash memory devices, and CD-ROM, DVD-ROM or other optical storage devices. The optional user inputs 506 and 507 comprise devices that communicate inputs from one or more users to the computer system 512 (e.g., mice, joysticks, cameras, touch screens, and/or microphones).

A communication or network interface 508 allows the computer system 512 to communicate with other computer systems, networks, or devices via an electronic communications network, including wired and/or wireless communication and including an Intranet or the Internet. The display device 510 may be any device capable of displaying visual information in response to a signal from the computer system 512 and may include a flat panel touch sensitive display, for example. The components of the computer system 512, including the CPU 501, memory 502/503, data storage 504, user input devices 506, and graphics subsystem 505 may be coupled via one or more data buses 500.

In the embodiment of FIG. 5, a graphics subsystem 505 may be coupled with the data bus and the components of the computer system 512. The graphics system 505 may comprise a physical graphics processing unit (GPU) and graphics/video memory. GPU may include one or more rasterizers, transformation engines, and geometry engines, and generates pixel data from rendering commands to create output images. The physical GPU can be configured as multiple virtual GPUs that may be used in parallel (e.g., concurrently) by a number of applications or processes executing in parallel, or multiple physical GPUs may be used simultaneously. Graphics subsystem 505 can output display data to display device 510.

Embodiments of the present invention are thus described. While the present invention has been described in particular embodiments, it should be appreciated that the present invention should not be construed as limited by such embodiments, but rather construed according to the following claims.

What is claimed is:

1. A method for managing a workload of a call center, said method comprising:
  receiving a plurality of customer inquiries from customers over communication channels of the call center;
  assigning an initial interactivity score to a respective inquiry based on a type of communication channel over which the respective inquiry is received, wherein the initial interactivity score is based on a rate of inquiries satisfied over the type of communication channel;
  assigning skill levels to a plurality of agents;

determining agent interactivity scores of the plurality of agents;

assigning the customer inquiries to the agents based on initial interactivity scores of the inquiries, the agent interactivity scores, and the skill levels;

measuring real-time engagement levels between the agents and the customers during communication sessions therebetween;

determining that a first agent of the plurality of agents is struggling to complete a specific inquiry, wherein the determining is based on at least one of: an engagement level of the agent dropping significantly; and an idle time of a customer associated with the specific inquiry;

assigning a struggling indicator to the first agent; and reassigning a customer inquiry assigned to the first agent to a second agent of the plurality of agents responsive to said struggling indicator.

2. The method described in claim 1, wherein said determining that a first agent of the plurality of agents is struggling to complete the specific inquiry comprises comparing a first real-time engagement level to a second real-time engagement level, and further comprising assigning resources to the first agent when the second real-time engagement level is significantly lower than the first real-time engagement level.

3. The method described in claim 1, further comprising adjusting a skill level of the first agent responsive to said determining that the first agent of the plurality of agents is struggling to complete the specific inquiry.

4. The method described in claim 1, further comprising generating a visual notification indicating a potential problem with a first customer inquiry assigned to the first agent responsive to said determining that the first agent of the plurality of agents is struggling to complete the specific inquiry.

5. The method described in claim 1, wherein said determining that the first agent of the plurality of agents is struggling to complete the specific inquiry comprises measuring a rate of communication of a customer inquiry involving the first agent and a first customer.

6. The method described in claim 1, further comprising measuring a duration of a first customer inquiry assigned to the first agent and comparing the duration to an expected duration associated with the first customer inquiry.

7. The method described in claim 1, wherein said determining that a first agent of the plurality of agents is struggling to complete the specific inquiry comprises determining that a communication session associated with a first customer inquiry assigned to the first agent has ended.

8. The method described in claim 1, wherein said determining that a first agent of the plurality of agents is struggling to complete the specific inquiry determining that a customer associated with a first customer inquiry has sent customer inquiries over multiple communication channels.

9. The method described in claim 1, wherein said determining that a first agent of the plurality of agents is struggling to complete the specific inquiry comprises determining that a customer associated with a first customer inquiry assigned to the first agent has sent a different inquiry within a predetermined time period, and further comprising assigning resources to the first agent responsive to determining that the customer associated with the first customer inquiry assigned to the first agent has sent the different inquiry within the predetermined time period.

10. A system for managing a workload of a call center, said system comprising:
a memory; and
a processor in communication with said memory and executing an application to perform a method for assigning tasks to agents, said method comprising:
receiving a plurality of customer inquiries from customers over communication channels of the call center;

assigning an initial interactivity score to a respective inquiry based on a type of communication channel over which the respective inquiry is received, wherein the initial interactivity score is based on a rate of inquiries satisfied over the type of communication channel;

assigning skill levels to a plurality of agents;

determining agent interactivity scores of the plurality of agents;

assigning the customer inquiries to the agents based on initial interactivity scores of the inquiries, the agent interactivity scores, and the skill levels;

measuring real-time engagement levels between the agents and the customers during communication sessions therebetween;

determining that a first agent of the plurality of agents is struggling to complete a specific inquiry, wherein the determining is based on at least one of: an engagement level of the agent dropping significantly; and an idle time of a customer associated with the specific inquiry;

assigning a struggling indicator to the first agent; and reassigning a customer inquiry assigned to the first agent to a second agent of the plurality of agents responsive to said struggling indicator.

11. The system described in claim 10, wherein said method further comprises receiving customer satisfaction ratings from the customers and adjusting the skill levels based on the customer satisfaction ratings.

12. The system described in claim 10, wherein said determining that a first agent of the plurality of agents is struggling to complete the specific inquiry comprises comparing the first engagement level to a second engagement level, and wherein said method further comprises assigning resources to the first agent when said second engagement level is significantly lower than said first engagement level, and wherein said resources comprise at least one of: information related to the customer inquiry; information related to a customer; information related to a product; and an additional agent to assist the first agent.

13. The system described in claim 10, wherein said method further comprises generating a visual notification indicating a potential problem with a first customer inquiry assigned to the first agent responsive to said determining that the first agent of the plurality of agents is struggling to complete the specific inquiry.

14. The system described in claim 10, wherein said determining that the first agent of the plurality of agents is struggling to complete the specific inquiry comprises measuring a rate of communication of a customer inquiry involving the first agent and a first customer.

15. The system described in claim 10, wherein said determining that a first agent of the plurality of agents is struggling to complete the specific inquiry comprises measuring a duration of a first customer inquiry assigned to the first agent and comparing the duration to an expected duration associated with the first customer inquiry.

16. A non-transitory computer-readable storage medium embodying instructions that, when executed by a processor, cause the processor to perform a method of managing a workload of a call center, said method comprising:

receiving a plurality of customer inquiries from customers over communication channels of the call center;

assigning an initial interactivity score to a respective inquiry based on a type of communication channel over which the respective inquiry is received, wherein the initial interactivity score is based on a rate of inquiries satisfied over the type of communication channel;

assigning skill levels to a plurality of agents;

determining agent interactivity scores of the plurality of agents;

assigning the customer inquiries to the agents based on initial interactivity scores of the inquiries, the agent interactivity scores, and the skill levels;

measuring real-time engagement levels between the agents and the customers during communication sessions therebetween;

determining that a first agent of the plurality of agents is struggling to complete a specific inquiry, wherein the determining is based on at least one of: an engagement level of the agent dropping significantly; and an idle time of a customer associated with the specific inquiry;

assigning a struggling indicator to the first agent; and reassigning a customer inquiry assigned to the first agent to a second agent of the plurality of agents responsive to said struggling indicator.

17. A method of managing workloads in a call center, said method comprising:

receiving customer inquiries over a plurality of different types of communication channels;

assigning customer inquiries to agents of the call center wherein a first customer inquiry of said customer inquiries is assigned to a first agent and wherein said first customer inquiry involves a first customer;

measuring a performance of said first agent by real-time automatic measuring of an engagement level of the first customer inquiry during a communication involving the first agent and the first customer;

determining that a first agent of the plurality of agents is struggling to complete the first customer inquiry, wherein the determining is based on the cadence of the communication, a tone of the first customer, and a total duration of the communication; and automatically performing an assistance function for the first agent based on the determining and the engagement level, wherein the performing an assistance function comprises reassigning assigning the first customer inquiry to a second agent.

18. The method described in claim 17, wherein the performing an assistance function comprises assigning additional resources to the first agent.

19. The method described in claim 17, wherein the determining is further based on a rate of communication of the communication.

20. The method described in claim 17, further comprising comparing the duration of the communication to an expected duration associated with the first customer inquiry.

* * * * *